United States Patent
Chen et al.

(10) Patent No.: US 7,958,544 B2
(45) Date of Patent: Jun. 7, 2011

(54) DEVICE AUTHENTICATION

(75) Inventors: Kai Chen, Santa Clara, CA (US);
Marius C. Milner, Palo Alto, CA (US);
Shioupyn Shen, Saratoga, CA (US);
Tsuwei Chen, Cupertino, CA (US)

(73) Assignee: Google Inc., Mountain View, CA (US)

( * ) Notice: Subject to any disclaimer, the term of this patent is extended or adjusted under 35 U.S.C. 154(b) by 854 days.

(21) Appl. No.: 11/781,736

(22) Filed: Jul. 23, 2007

(65) Prior Publication Data

US 2008/0022377 A1   Jan. 24, 2008

Related U.S. Application Data

(60) Provisional application No. 60/832,321, filed on Jul. 21, 2006.

(51) Int. Cl.
*G06F 7/04* (2006.01)
(52) U.S. Cl. ............................ 726/5; 713/183
(58) Field of Classification Search ....... 726/5; 713/183
See application file for complete search history.

(56) References Cited

U.S. PATENT DOCUMENTS

| 5,732,137 | A | 3/1998 | Aziz |
| 6,442,687 | B1 | 8/2002 | Savage |
| 7,100,054 | B2 * | 8/2006 | Wenisch et al. ............ 713/185 |
| 7,640,579 | B2 * | 12/2009 | Shewchuk et al. ............ 726/10 |
| 2002/0178366 | A1 * | 11/2002 | Ofir .............................. 713/182 |
| 2003/0014631 | A1 | 1/2003 | Sprague |
| 2003/0033545 | A1 | 2/2003 | Wenisch et al. |
| 2003/0084165 | A1 | 5/2003 | Kjellberg |
| 2003/0188201 | A1 | 10/2003 | Venkataramappa |
| 2003/0204732 | A1 | 10/2003 | Audebert et al. |
| 2003/0210789 | A1 | 11/2003 | Farnham |
| 2004/0128259 | A1 | 7/2004 | Blakeley |
| 2005/0246779 | A1 | 11/2005 | Yegin |

FOREIGN PATENT DOCUMENTS

| EP | 00851335 | 7/1998 |
| WO | WO 2004047362 | 6/2004 |
| WO | WO 2004059588 | 7/2004 |
| WO | WO 2005086411 | 9/2005 |

* cited by examiner

*Primary Examiner* — Kambiz Zand
*Assistant Examiner* — Amare Tabor
(74) *Attorney, Agent, or Firm* — Fish & Richardson P.C.

(57) ABSTRACT

A computer-implemented method of assisting in establishing a secure communication is disclosed. The method includes obtaining an encryption key that is shared with a credentialing device, receiving from a client device an encrypted session identifier that encodes a password, decrypting the session identifier with the key to extract the password, and authenticating a communication session for the device using a challenge-response protocol.

24 Claims, 6 Drawing Sheets

DEVICE AUTHENTICATION

CROSS-REFERENCE TO RELATED APPLICATIONS

This application claims priority to U.S. Provisional Application 60/832,321, filed on Jul. 21, 2006, the contents of which are hereby incorporated by reference.

BACKGROUND

This invention relates to communications between computers on a network, and more particularly to privacy issues relating to those communications.

Electronic networks allow people to communicate with each other efficiently over distances. Such networks have grown over the years both in size and complexity. Larger networks provide users with many benefits, because connecting to more people makes a network much better for each user. The Internet is an excellent example. Much of its usefulness comes from its size. Specifically, because almost everyone with e-mail is connected to the internet, e-mail becomes efficient for everyone because they can assume that a message they want to send will easily reach its target. In addition, the massive size of the World Wide Web also makes it particularly useful, because users can be confident that they will find information they need. (Finding the information may be a whole other matter, and is addressed capably by search engines such as the Google search service.)

Users of the Internet obtain so much benefit from being networked that they now want access to the internet wherever they might be. For example, users want access from their offices, from their homes, from stores (such as coffeehouses), from their cars, form hotel rooms and airports, and from any other place at which they may want to communicate with others. To extend their ability to use their devices (e.g., laptops, smart phones, and PDAs) in more places, users have increasingly been using wireless communication devices, such as WiFi or WiMAX devices. Also, public facilities such as coffeehouses have been making wireless internet access available, and cities have begun providing community-wide wireless internet access.

Hackers and other ne'er-do-wells may seek to tap into communications on a network. For example, thieves may seek to intercept communications so as to identify financial information or to listen in on telephone conversations (such as over digital packet-based networks). Others, such as hackers, may seek to obtain user names and passwords so as to later access resources on a network for malicious purposes. To prevent such security breaches, users of remote devices use a Virtual Private Network (VPN) or other such approach to communicate with a central network such as a corporate LAN or WAN.

SUMMARY

This document describes systems and techniques relating to device authentication for networks. In general, the systems and techniques may assist in providing access to a secure network. For example, a system may transmit a session identifier to provide a password, an identifier, and a time-stamp to a client. The system may use such information in analyzing a session identifier to ensure that a client trying to access a private network is a legitimate client with a viable session identifier.

In one implementation, a computer-implemented method of assisting in establishing a secure communication is disclosed. The method comprises obtaining an encryption key that is shared with a credentialing device, receiving from a client device an encrypted session identifier that encodes a password, decrypting the session identifier to extract the password, and authenticating a communication session for the device using a challenge-response protocol. In some aspects, the encrypted session identifier may allow a session-holder to remain anonymous. The encrypted session identifier may also comprise a user identifier and a password. In addition, the session identifier may further comprise data relating to the communication session. The communication session may also occur over a private network using a VPN protocol.

In another implementation, a system for assisting in establishing a secure communication is disclosed. The system comprises an encryption-key generator, a credential server configured to generate a session identifier with an embedded password, and a plurality of authentication servers adapted to receive an encrypted object derived from the session identifier with the embedded password, extract the password from the encrypted object, and authenticate a communication session by a remote device using a challenge-response protocol. The client may have an Internet Protocol address which corresponds to a network latency map of a plurality of authentication servers. Also, each of the plurality of authentication servers may be configured with a unique encryption key.

In yet another implementation, a system for assisting in establishing a secure communication is disclosed. The system comprises memory storing one or more encryption keys shared with a credential server, a credential decryptor to obtain a password from an encrypted communication session identifier, and a challenge-response authenticator adapted to communicate with a remote device to authenticate a communication session for the device using the password. The system may further comprise a verification module that verifies session-related information obtained from the session identifier. The session-related information may also comprise a session time-stamp, and the session verifier may verify that a time for the communication session has not expired.

In still another implementation, a system for assisting in establishing a secure communication is described. The system comprises memory storing one or more encryption keys shared with a credential server, means for obtaining a password from an encrypted communication session identifier, and a challenge-response authenticator adapted to communicate with a remote device to authenticate a communication session for the device using the password.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
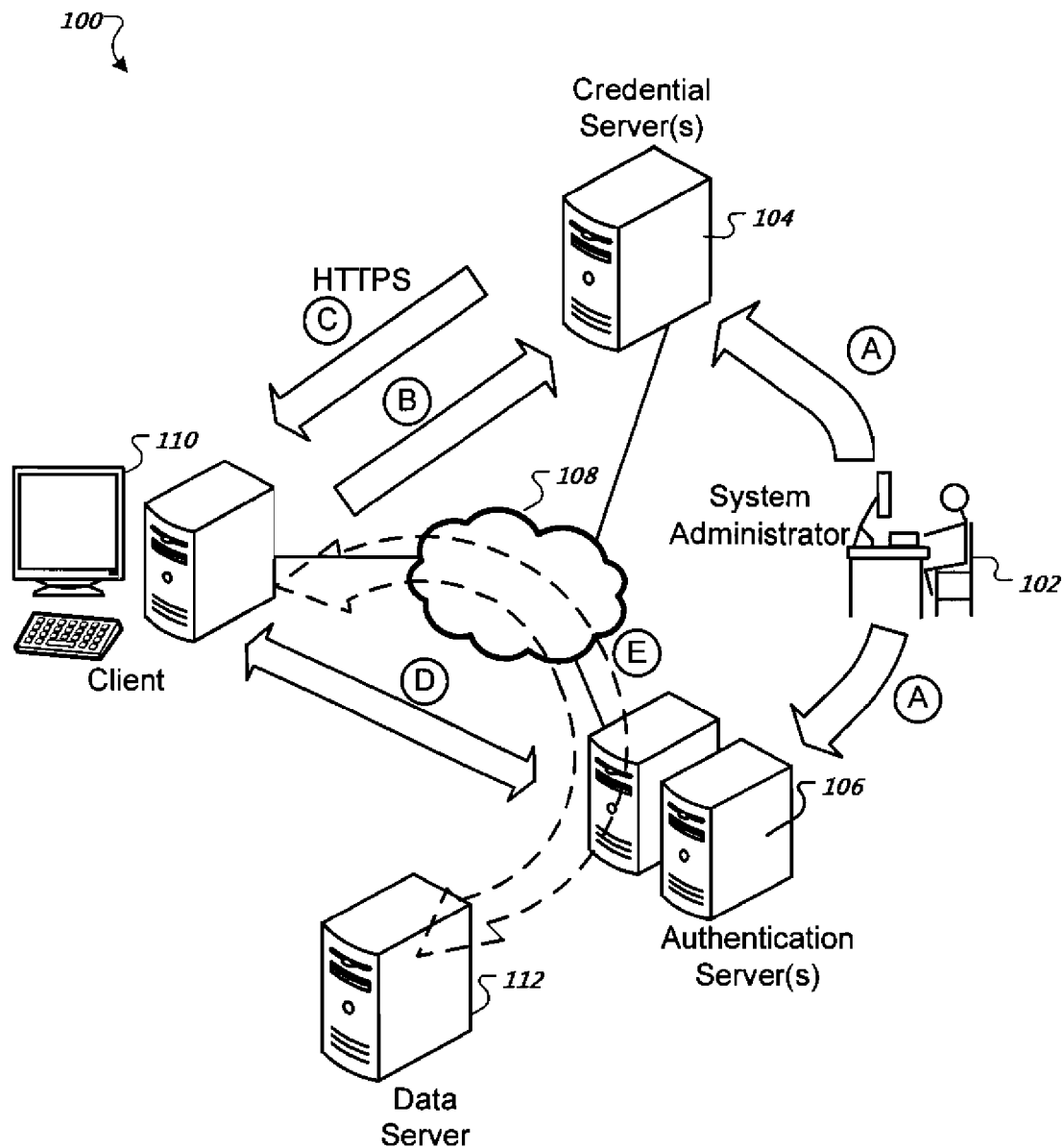
FIG. 1 shows a conceptual diagram of an information flow for authenticating a device for communication over a network.

FIG. 1 shows a conceptual diagram of an information flow for authenticating a device for communication over a network. In general, a system 100 includes a credential server 104 (or credential servers) and an authentication server or servers 106, that may both receive a secret key, such as from a computing device operated by a system administrator 102. The credential server 104 may then use that key to encrypt credentials in response to requests from users who want to access resources on a network 108, and may provide such users with information in the form of a session identifier that may include a password. The user (through a device operated for the user's benefit) may then pass the identifier to the authentication servers 106, which may decrypt the identifier, verify that the identifier is legitimate, and pull the password out of it for use in a challenge-response approach to authenticate the user's device.

In various forms, such an exemplary approach may have one or more of the following advantages. It may permit simplified access for users to systems such as VPNs. The access may occur using machine generated identifiers that a user need not be able to remember easily. The techniques may be used to prevent accidental access to rogue servers, and may provide for reliable authentication of users by authenticating user devices. In addition, such access may be automated for, and made transparent to, a user.

In addition, the credential server and the authentication server need not communicate directly with each other. As a result, the credential server may be provided at a more secure location even if the authentication server cannot, because, for example, the authentication server is connected directly to the Internet. And, with the servers in different locations, it may be beneficial to eliminate communication between them because of security concerns with the installations.

As shown in FIG. 1, various components of system 100 may communicate by way of network 108. Credential server 104, which may be a single server or multiple servers coordinated to operate together, may be configured to receive requests from various devices for network credentials, and to respond with credentials such as a VPN login credential. As explained in more detail below, the provided credential may include a user name and password, and the password may be encoded in a user name or in another identifier associated with the credential. The credential may also have other information encoded into it, such as by concatenation or by another appropriate techniques.

For example, additional information about the credential server may be encoded, or a time at which the credential was created may be coded. Data may be used by other components, such as to determine whether a communication session to be associated with the credential has timed out because the credential is too old.

The authentication servers 106 may also be one or more servers configured to operate together, and may take the form of VPN servers. Servers 106 may establish a secure communication with client 110, so that client 110 may obtain or supply information with a reduced concern that a malicious party will be able to intercept any communications. Such communications may occur by way of standard VPN approaches or other such secure protocols.

In the illustrated embodiment, there are a plurality of authentication servers 106, which may be available to provide the client 110 with the lowest latency based on the distance an authentication server is to the client 110 through a network latency map and the client's IP address. In some embodiments, each authentication server may have its own encryption key. In other embodiments, the system administrator may change the key on a new authentication server every 24 hours. In yet other embodiments, there may be a client program that may be downloaded to the client to automate the client to request a connection from another server if one server does not answer, such as when a server may be shut down for maintenance. In still other embodiments, the client may be provided with a "long-lived" credential so that a private network communication may be manually configured. Clients may also be provided with a list of candidate servers to which they can make a connection, with the lowest cost, e.g., closest available server at the top of the list.

Client 110 may be, for example, a personal computer, such as in the form of a laptop computer, a smartphone or cell phone, or a personal digital assistant (PDA). Client 110 may be associated with a user who operates client 110. Client 110 may communicate with various servers through network 108. For example, client 110 may undertake a financial transaction with a server such as data server 112, and may need to have communications associated with that transaction protected from eavesdropping.

In one implementation, client 110 may be a portable device, including a laptop computer, accessing the Internet through a public access point, such as a public WiFi or WiMAX access point. In such an implementation, network 108 may be a network associated with a municipal area or other partially-public, partially-private network. Such a network 108 may be open to access to all users in an appropriate area who can obtain a signal for a wireless device. Such a device may then be connected by standard mechanisms to the network. When that connection to the network is made, a further communication may be authorized for secure communications as described in more detail below.

Under one technique, credentials may be passed to authentication servers 106 in an identifier for a particular communication session. The identifier may be used to provide access for a limited period of time, such as several seconds or minutes, for client 110. The credential server 104 may be configured to provide a password and a user name in a way a that only a legitimate authentication server may uncover the user name and password. Although the term "user name" is employed here, the user name need not identify a user, and may in appropriate circumstances provided for anonymity of the user. Instead, the user name and password correspond to traditional components of a credential.

Additional information components may also be included in the user name. For example, an identifier for the time at which the credential was created may be encoded into the user name, such as by concatenation. In such a situation, the system 100 may be established to permit authentication for only a limited period of time after a credential is created. In such a matter, the system 100 may create a moving target for any malicious eavesdroppers attempting to determine the appropriate codes for the system 100. In particular, once an eavesdropper determines the appropriate information for a credential, the credential will be expired.

The identifier may be encrypted by the credential server 104 before it is transmitted so as to prevent acquisition of the credentialing information by a malicious party. The encryption may take place by any appropriate method such as the AES, or other strong encryption algorithm. In one example, the key length may be 128 bits or more.

Keys for the encryption may be generated by a central source, such is a computer operated by a system administrator 102. The key may be any appropriate value, and may be shared between credential server 104 and authentication servers 106. Although shown in the figure as a direct communication from system administrator 102, the provision of the key may occur through an intervening network such as a LAN, WAN, or the Internet. In addition, credential server 104 or authentication servers 106 may also generate the key and share it with the other server (though credential server 104 would be the more likely key generating candidate because it would be more likely to be located in a secure part of a system). Other appropriate mechanisms for sharing keys may also be provided. In addition, keys may be generated automatically, such as at programmed intervals, to provide for refreshing of the keys. The use of updated keys may also be coordinated in appropriate manners so as to ensure continuous operation of system 100 with minimal errors.

The operation of system 100 is highlighted by various lettered arrows in FIG. 1. The arrows labeled "A" mark the beginning of a process, by which system administrator 102 generates a key and provides it to credential server 104 and authentication servers 106. The servers 104,106 may then in the future use the received key to encrypt and decrypt appropriate messages.

For example, client 110 may wish to have a secure communication through a wireless network, such as network 108. Such a need may arise if the client 110 is carrying out a financial transaction through network 108, or otherwise communicating in a manner that would benefit from the use of security. Client 110 may initially form a connection to network 108, and may then send a request for a credential to credential server 104, as shown by arrow B. The credential may be the ticket needed for the client 110 to carry out a communication session. In this embodiment, credential server 104 may generate data for a credential such as by generating random data in a large space. The credential server 104 may then encrypt the generated data using a strong encryption algorithm (e.g., AES) with the secret key received from system administrator 102.

The credential server may then supply both the random data and it's encrypted version of the data to the client 110 (Arrow C). To prevent a security breach in such a transmission, a secure channel, such as an HTTPS (e.g., TLS) channel, may be used.

The client 110 may then, typically almost immediately, present its user name to the authentication servers 106 in a clear text form (Arrow D). The authentication servers 106 may then decrypt the received user name to obtain the password that is hidden in the user name. Such a step may involve parsing the user name, or otherwise analyzing it to obtain a password.

With the password obtained by the authentication servers 106, a challenge-response protocol may be carried out to finish the authentication of the client 110 (Arrow D). For example, the PPTP protocol (RFC 2367) may be used in a conventional manner, but by employing information obtained using the techniques described above and below. Other such challenge-response protocols that rely on a user password to complete a challenge may also be employed. With the authentication complete, the authentication servers 106 may then provide client 110 with access to servers such as data server 112 (Arrow E).

In performing the authentication process as indicated by Arrow D, the network latency map may further provide the client 110 with the lowest-latency connection by connecting with the closest available authentication server 106. In further embodiments, the client 110 may try to connect to another authentication server if a first authentication server 106 is not functioning. The authentication server 106 may authenticate the encrypted session identifier and allow the client 110 to access the data server 112.

In the illustrated embodiment, only one data server 112 is shown. In other embodiments, the client 110 may connect to multiple data servers in a network. Such servers may be part of a private network (e.g., operated by the entity that operates network 108) or may be part of a public network such as the Internet. The authentication server 106 may provide the client 110 with a secure connection to the data server 112. In this embodiment, the client 110 may wish to connect to a private network using VPN protocol. In other embodiments, the private network may use other communications protocols, including SSL or PVP protocols.

In the manner just described, mutual authentication may be achieved, in the sense that no rogue VPN server can impersonate a legitimate VPN server, and no user credential can be generated by a server other than a legitimate credential server. In addition, by the techniques described, a system may avoid transferring a password in clear text over the network. As a result, eavesdropping on communications may be decreased substantially or eliminated. Therefore, the techniques described may in appropriate circumstances be particularly useful in networks, such as open or public wireless networks that would otherwise provide numerous opportunities for evesdropping.

Reference to clients and servers here does not suggest a particular, required architecture. Rather, a client may be a device obtaining information, and a server may be a device supplying the information. In certain circumstances, a device may be a client or a server.

Figure 2:
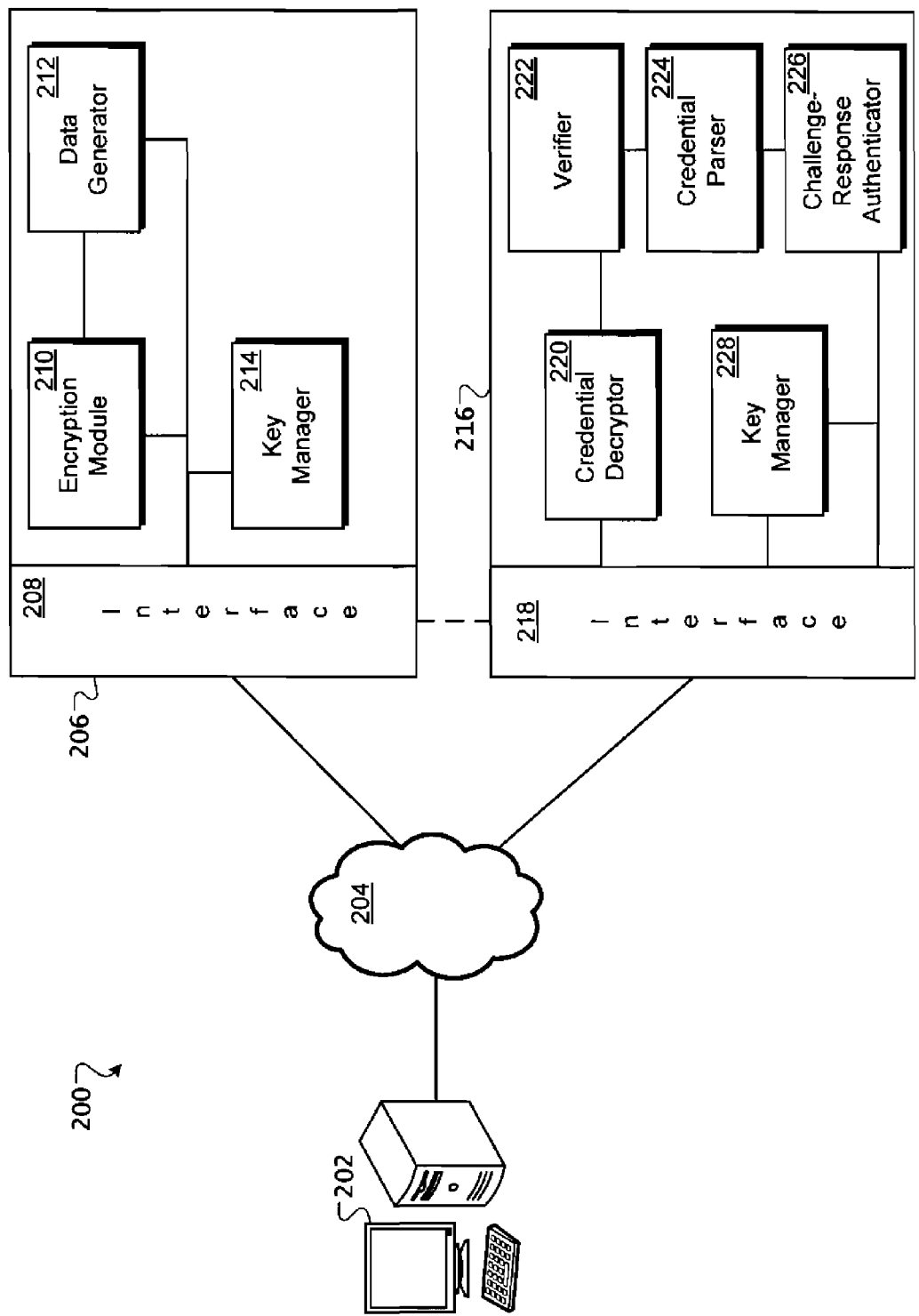
FIG. 2 is a block diagram showing a system for authenticating a remote device.

FIG. 2 is a block diagram showing a system 200 for authenticating a remote device. In general, the system 200 shares components, such as credential server 206 and authentication server 216, with the system shown in FIG. 1. The credential server 206 and the authentication server 216 are provided with appropriate modules and components that are configured to generate encrypted session identifiers, including identifiers that have a password encoded in the identifier, and to decrypt the identifier and carry out a challenge-response authentication process. In certain implementations, direct communications between the credential server 206 and the authentication server 216 may be eliminated, and may instead occur by shared reception of keys from a separate apparatus, and by communication of credentials through a client 202.

Credential server 206 and authentication server 216 may each communicate with other apparatuses through interfaces 208, 218. Interfaces 208, 218 may take standard forms so as to permit reception and dispatch of requests, such as network 204, and to format messages for transmission on network 204. An optional connection is shown between interface 206 and interface 218, though in certain implementations, a direct connection may be eliminated or even actively avoided.

Credential server 206 may include, among other components, an encryption module, a data generator 212, and a key manager 214. The key manager 214 may be configured to receive keys provided by another apparatus, to store those keys, and to provide the keys to other components of credential server 206, such as to encryption module 210. The key manager 214 may store a single key, or may store multiple keys, and may be programmed to provide keys in a manner that is coordinated in the system 200. For example, when a new key is provided to key manager 214, it may delay in using the key until a predetermined time, or upon the occurrence of a predetermined event. In this manner, credential server 206 and authentication server 216 may coordinate their activities so that their encryption and decryption methods match each other.

Data generator 212 may be configured to produce data for a credential in response to a credential request from a client, such as client 202. The request may be received through network 204, which may be a private network or the Internet, among others. The data may be random or pseudo random, such as random data generated in a large space. Other data, such as predetermined data, may also be used in appropriate circumstances. Selection of random data over certain forms of predetermined data may in some circumstances provide a benefit of being more difficult to break using brute force attacks such as dictionary attacks.

Encryption module 210 may then obtain the appropriate key from key manager 214, and the data generated by data generator 212, and may encrypt the data using the key. The encryption may occur by any appropriate technique, such as AES encryption, Blowfish encryption, or DES encryption.

The credential server 206 may then pass the encrypted data and the unencrypted data to client 202. The random data may be treated as the password and the encrypted data may be treated as a user name. All or part of the transmitted data may serve as a session identifier for a communication session associated with the request by the client 202.

Additional data may also be incorporated in the transmission. For example, a timestamp may be appended to the end of the random data and may be extracted from transmitted data, such as an encrypted form of the random data and timestamp, in a mutually agreed upon manner by various servers.

Authentication server 216 may be configured to receive all or some of the data transmitted by the credential server 206. In one embodiment, authentication server 216 receives the encrypted form of the data provided to client 202 by credential server 206. Authentication server 216 may contain a number of components or modules for decrypting a received encrypted identifier, verifying that the identifier is timely or otherwise legitimate, parsing information from the identifier, and instituting an authentication process, such as a challenge-response authentication process to authenticate a user such as client 202.

Credential decryptor 220 may receive messages through interface 218, such as session identifiers for authenticated a communication session for a user such as client 202. Credential decryptor 220 may draw upon key manager 228 to obtain a key for decrypting the received information. Key manager 228 may be configured similarly to key manager 214, and the key managers 228, 214 may both receive and use a common key so as to enable decryption by credential decryptor 220 of information encrypted by encryption module 210. A decrypted credential may then be parsed to obtain relevant portions of information from it, and may be verify to ensure that it is a timely or otherwise appropriate credential. For example, credential parser 224 may be configured to analyze and to separate password information from the rest of the received information. In addition, credential parser 224 A. also extract other information such as a timestamp. He parsing may occur according to a predetermined standard, such as by splitting the received information at predetermined positions in a received and decrypted string.

The verifier 222 may check data within the received session identifier to determine whether the session identifier is valid. In one embodiment, the verifier 222 may check a time stamp in the session identifier to determine whether the session identifier has expired. In further embodiments, the verifier 222 may reject the session identifier if the verifier 222 finds the session identifier to be invalid. In another embodiment, the verifier may check an IP address in the session identifier to determine whether the IP address is a valid IP address.

If a session identifier is determined to be valid, the password in the identifier may be transmitted to a challenge-response authenticator 226. The authenticator may take many forms. The challenge-response authentication may be performed so that the authentication server 218 may determine whether the client 202 is authorized, or credentialed, to make a secure communication. In the simplest form, it might simply request a password from the client 202, and the client may respond by providing the unencrypted portion of the data received from the credential server. The authentication may likewise occur using a standard protocol such as PPTP, RFC 2367.

Figure 3:
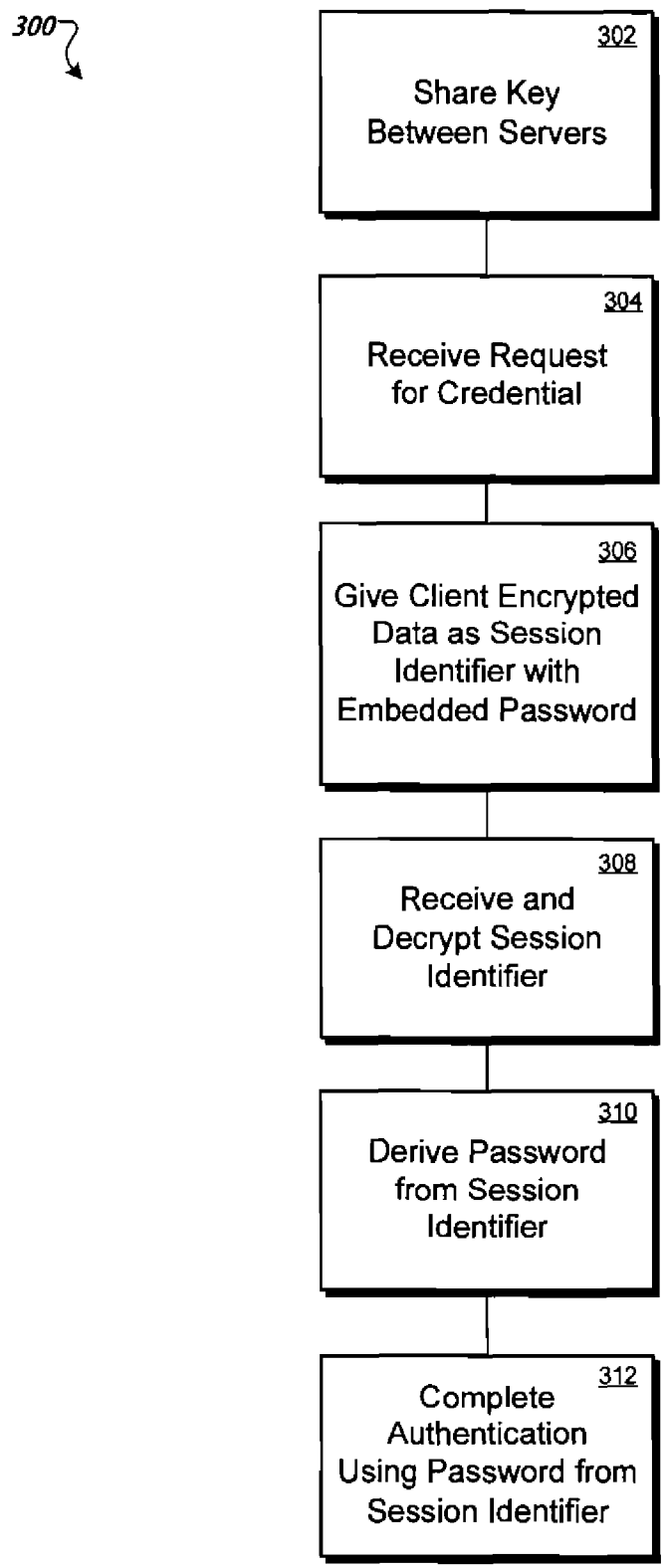
FIG. 3 is a flow chart illustrating a method for assisting in establishing a secure communication.

FIG. 3 is a flow chart illustrating a method for assisting in establishing a secure communication. In general, the process is similar to those discussed above, and may be carried out by a system such as system 200 in FIG. 2. The process generally involves sharing an encryption key between servers, generating data for a credential, such as in the form of data for a password, and encrypting the data, passing the encrypted data to an authentication server that has a key, decrypting the information to obtain a password encoded in the information (which may be viewed as a user name), and authenticating the client such as by standard authentication mechanisms.

At step 302, a key is initially shared between servers such as a credential server and an authentication server, so that information may be generated in an encrypted format by one server, and decrypted and operated upon by another server. The key may be supplied from an apparatus apart from the credential server or the authentication. In addition, different keys may be shared or updated periodically so as to provide greater security for communications in the process.

At some time after keys are provided, the credential server receives a request from a client for a credential (step 304). Of course, in a typical situation, many such requests may be received from many different clients. The request causes the credential server to begin a credentialing process that involves generating data for a password, and encrypting the data. Additional data may also be identified or generated and may be added to the generated data either before or after the encrypting takes place. That data may include, for example, a time stamp, which may be a 4-byte time stamp that indicates, for example, the seconds passed since the Unix epoch. The password data may be randomly generated data, such as 12-byte random binary data. The data (e.g., 16-byte data) may then be, for example, Base64 encoded to produce a twenty-four character printable ASCII string, and two padding characters at the end of the string may be discarded. This encoded material may be considered to include or to be a password.

The 16-byte binary data may then be encrypted using, for example, a 128-bit key shared with an authentication server, to generate a 16-byte binary cipher-text, and the cipher-text may be Base64 encoded to produce a twenty-four character printable ASCII string, along with the removal of two padding characters on the string. This twenty-four character string may be taken to be a user name. The password and the user name may then be provided to the client (step 306).

Either or both of the password and user name (alone or in combination) may be considered to be a session identifier for a particular requested secure communication session. At step 308, the encrypted data is provided by the client to an authentication server such as a VPN server. The server derives the password from the submitted identifier by reversing the process just described. For example, the authentication server may first Base64 decode the user name to produce the original 16-byte clear text, and may then extract the 4-byte time stamp from it. The authentication server may then check or verify whether the time stamp has expired (e.g., 1-5 minutes after issuing), or whether other information incorporated into the user name is invalid.

A range of time around the time stamp is provided, for example, to accommodate for latency or delay in passing the user name from the certificate server to the authentication server, and also to accommodate clock differences between the two servers. For example, if the certificate server runs more than five minutes ahead of the authentication server, and the authentication server is set to allow access only when a time stamp is less than five minutes old, no sessions will be carried by that authenticator. On the other hand, if the certificate server runs five minutes behind the authentication server, certificates up to ten minutes old may be served. In any event, a properly selected time range may permit for needed flexibility, and yet provide sufficient security against interlopers who might try to break a code.

Further in the process at step 310, if the certificate is valid (e.g., a time stamp has not expired), the 16-byte clear text may be Base64 encoded to produce the 22-character password. That derived password may then be used to complete an authentication protocol with a client device (step 312).

A client-side program may be provided to a client device to automate the process of obtaining credentials, choosing a server, and connecting to the chosen server. Such a program may also provide fault-tolerance, such as allowing a client to connect to a second VPN server if a first selected server is unavailable, and to automatically reconnect to a VPN server when a user roams between access points.

Alternatively or in addition, certain long-lived credentials may be provided when requested, so that a user may manually configure a VPN connection and save the credentials for later use. Although longer lived than the credentials discussed above, such a credential may nonetheless expire in the event of a server re-keying. In such a situation, a user may have to request credentials again and reconfigure the VPN connection. Such an approach may be appropriate for a user who does not want to install a special client program to manage connections automatically.

Figure 4:
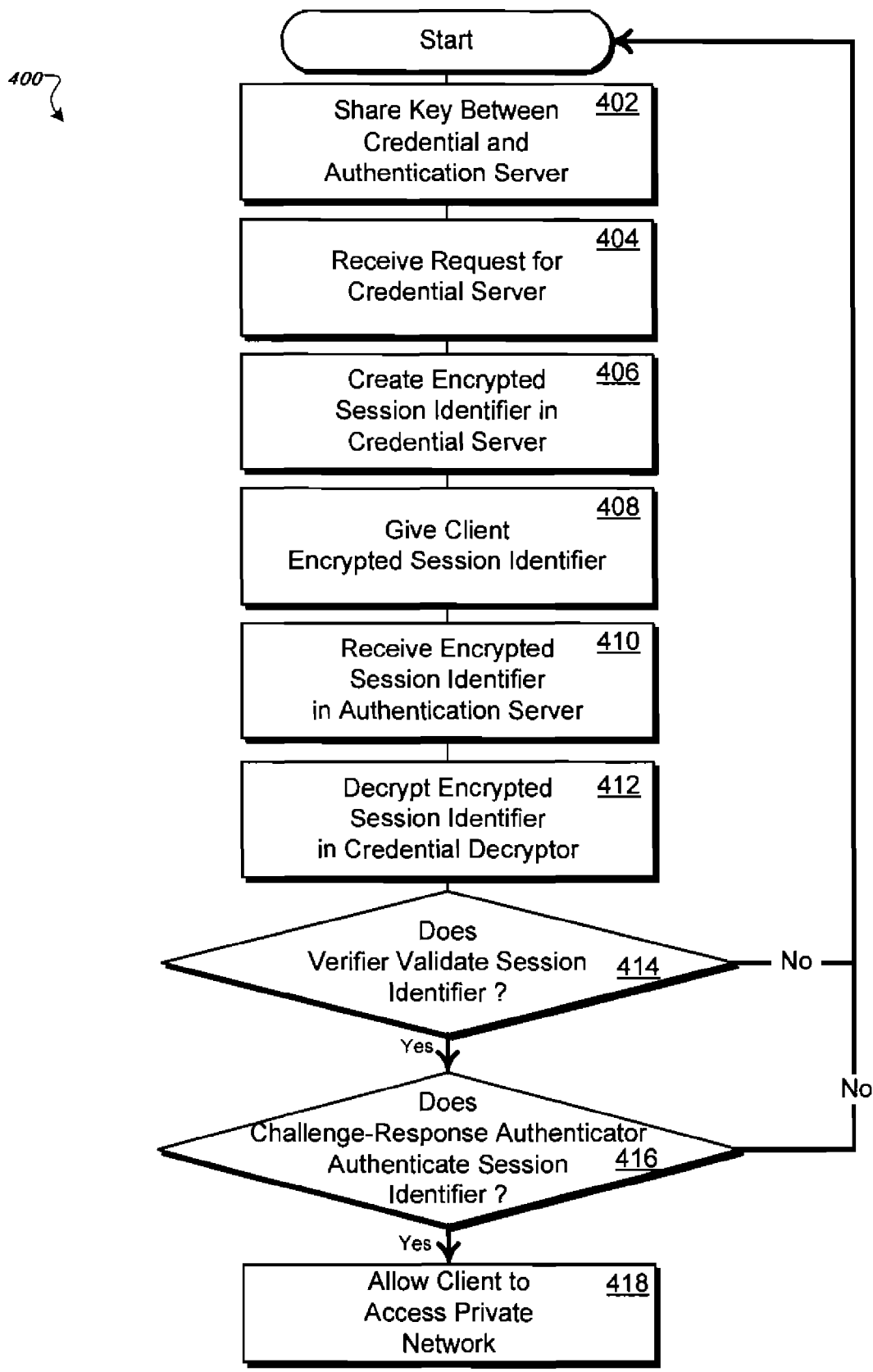
FIG. 4 is a flow chart further illustrating a method for assisting in establishing a secure communication.

FIG. 4 is a flow chart further illustrating a method 400 for assisting in establishing a secure communication. The process shown here is similar to that in FIG. 3, and contains additional detail compared to the earlier figure. First, a key is shared between a credential server and an authentication server (step 402).

The credential server receives a request from a client (step 404), and the credential server creates an encrypted session identifier (step 406). The credential server then gives the client the encrypted session identifier (step 408), and may also give the client an unencrypted form of the session identifier.

The authentication server receives the encrypted session identifier from the client (step 410). It decrypts the encrypted session identifier in a credential decryptor (step 412). The server then determines whether data in the unencrypted session identifier indicates that the identifier may be properly verified (step 414). For example, the session identifier may have a time-stamp that may have expired. If the verifier determines that the time-stamp has expired, the request for a credential from the client is rejected, and the client may reapply. If the verifier determines that the time-stamp has not expired, so that the information is verified, a challenge-response authenticator receives the session identifier.

The challenge-response authenticator then carries out a authentication protocol with the client (e.g., PPTP VPN, RFC 2367), and if the data from the session identifier properly authenticates the client, the client is allowed to access the resources through, for example, a VPN (416, 418). If the information is not authenticated, the user does not receive access, and the process returns to the start and either waits for another credential request or for an indication to share an updated key, if applicable.

Figure 5:
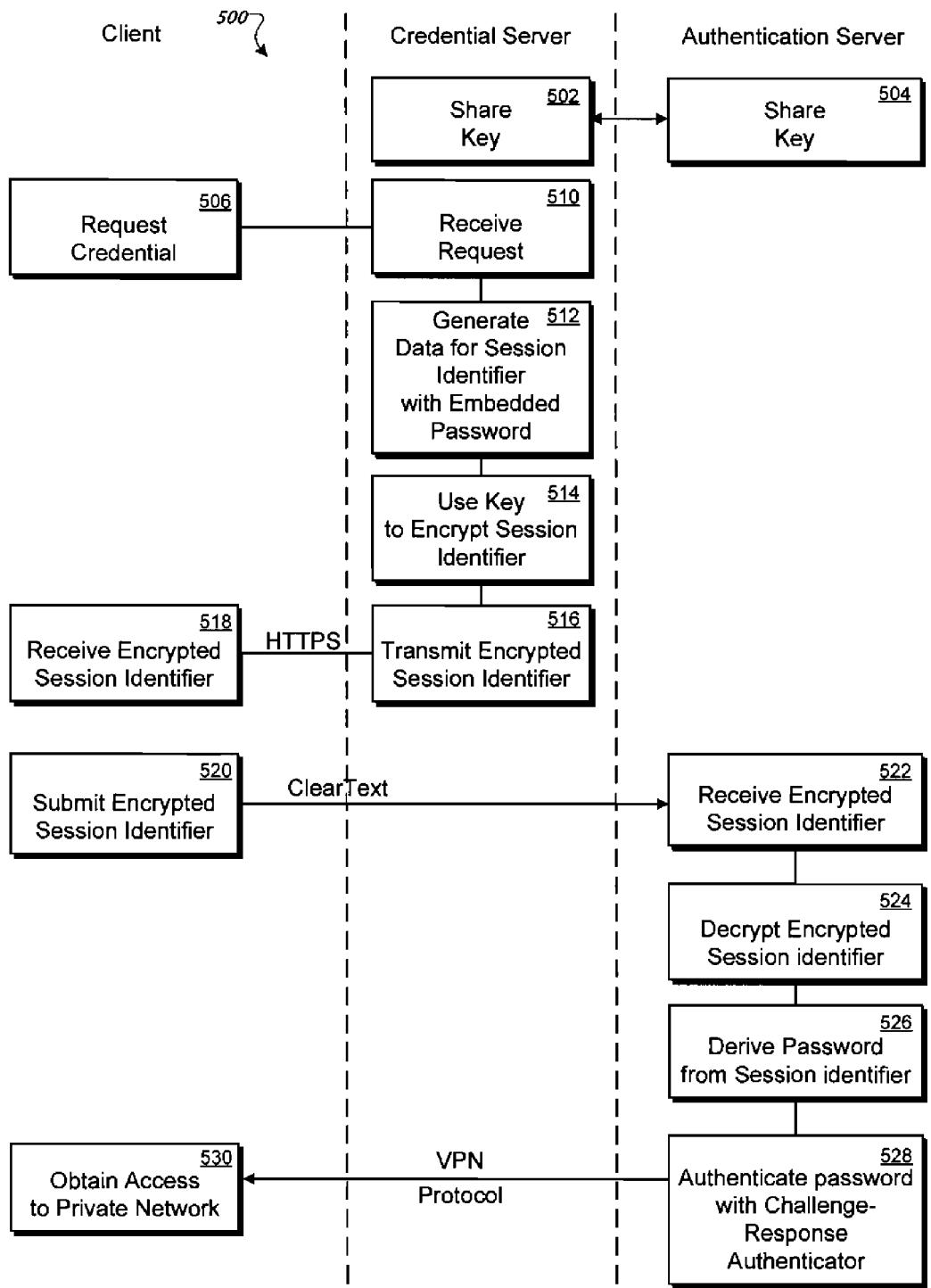
FIG. 5 is a swim lane diagram illustrating an embodiment of a process for establishing a secure communication utilizing a credential server and an authentication server.

FIG. 5 is a swim lane diagram illustrating an embodiment of a process 500 for establishing a secure communication utilizing a credential server and an authentication server. In general, this diagram shows an authentication process as performed across a credential server, an authentication server, and a client. Although the steps may be reordered or eliminated, performed on other apparatuses, or other steps may be added, the illustrated embodiment is provided to provide additional detail.

The process 500 begins when a credential server and an authentication server share a key, such as by each receiving a key from a third-party (502, 504). Although the figure shows the servers connected in this step, the embodiment may involve no direct communication between the servers.

At some point, a client requests a credential from the credential server (506). The credential server receives the request from the client (508), and generates data for a session identifier with an embedded password (510), such as by the mechanisms described above with respect to FIG. 3. The credential server uses the key to encrypt the data (512). The credential server transmits the encrypted data (516), and may also transmit unencrypted data, such as in the form of a password. In this embodiment, the credential server transmits the encrypted session identifier using HTTPS protocol. In other embodiments, the credential server 104 may use another encrypted protocol layered over HTTP.

The client receives the encrypted session identifier from the credential server (518), and the client then submits the encrypted session identifier to the authentication server (520). In this embodiment, the client submits the encrypted session identifier as clear text material. In other embodiments, the encrypted session identifier may be submitted using cipher text through an encryption algorithm or method.

The authentication server receives the encrypted session identifier from the client (522). The authentication server decrypts the encrypted session identifier (524), and derives the password from the decrypted session identifier (526). The server then authenticates the password with challenge-response protocol (528), at which time the client obtains access to a private network (530). In this embodiment, the client obtains access to the network through VPN protocol. In other embodiments, the client may obtain access to the network through other communications protocols, including SSL or PVP protocols.

Figure 6:
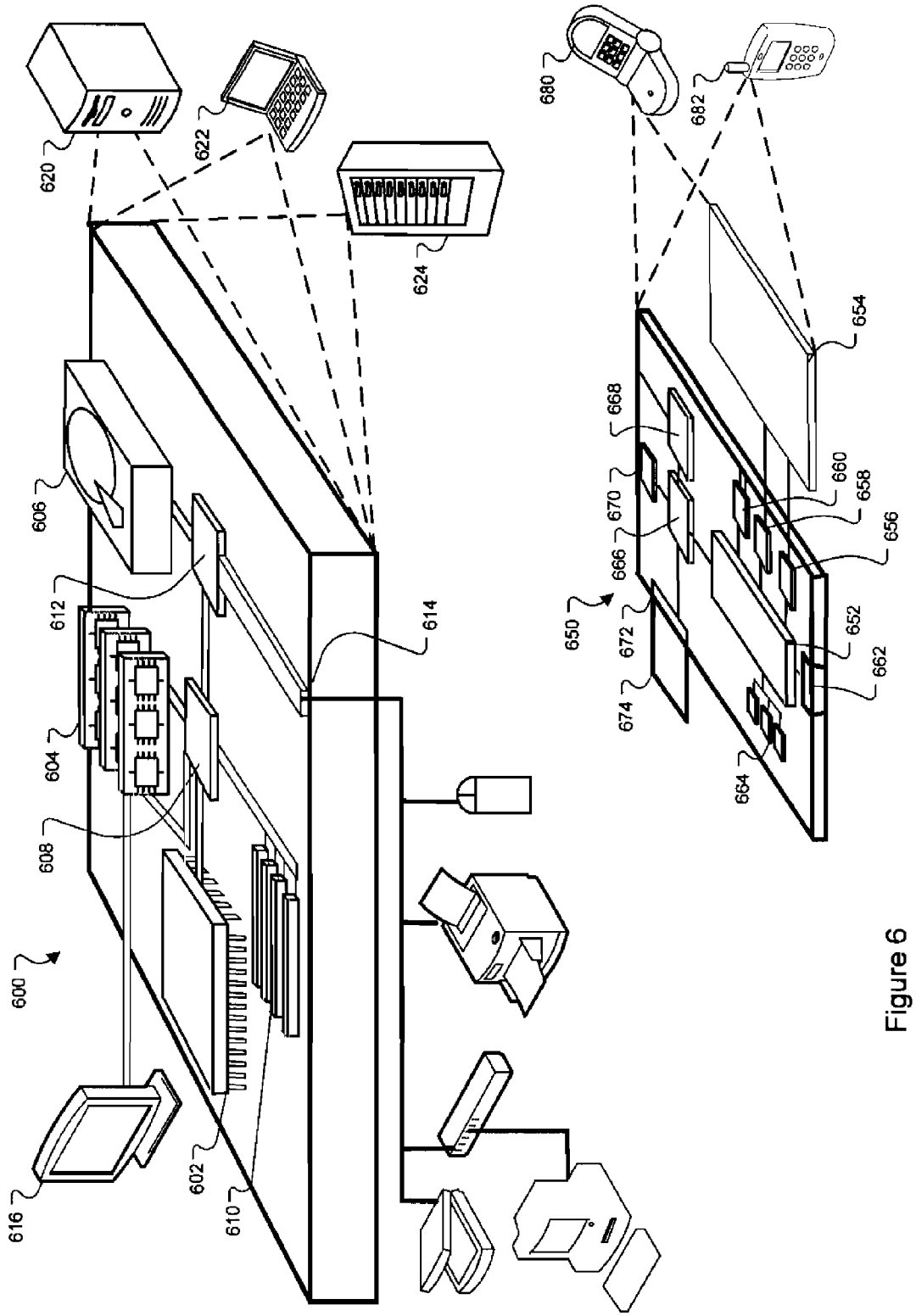
FIG. 6 is a block diagram of general computing devices.

FIG. 6 is a block diagram of general computing devices 600, 650. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.0

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of providing authentication for secure communication and methods have been described, it should be recognized that numerous other applications are contemplated. Accordingly, other embodiments are within the scope of the following claims.

What is claimed is:

1. A computer-implemented method comprising:
receiving, at an authentication server system and from an administrator server system, an encryption key that the administrator server has also shared with a credentialing server system, wherein the authentication server system and the credentialing server system are not in direct communication with each other;
receiving, at the authentication server system and from a client device, an encrypted session identifier that encodes a password that the credentialing server system has caused to be encrypted for the client device using the encryption key;
determining the password, at the authentication server system, by decrypting the session identifier with the encryption key to extract the password without having directly received the encrypted session identifier from the credentialing server system; and
authenticating, at the authentication server system, a communication session for the client device using the password,
wherein the password is determined by decrypting the session identifier received from the client device, and without receiving the password from another source.

2. The method of claim 1, further comprising extracting information about the communication session from the session identifier.

3. The method of claim 1, wherein the encrypted session identifier allows a session-holder to remain anonymous.

4. The method of claim 1, wherein the encryption key is obtained from a system administrator terminal.

5. The method of claim 1, wherein the password is generated from pseudo-random or random data.

6. The method of claim 1, wherein the encryption key comprises a machine-generated string of characters.

7. The method of claim 6, wherein the string of characters is 128 bits in length or more.

8. The method of claim 1, wherein the encrypted session identifier comprises a user identifier and the password.

9. The method of claim 1, wherein the password is encrypted using the advanced encryption standard protocol.

10. The method of claim 1, wherein the password comprises a machine-generated string of characters.

11. The method of claim 1, wherein the session identifier further comprises information relating to a parameter of the communication session.

12. The method of claim 11, wherein the information comprises a session time-stamp.

13. The method of claim 12, wherein the session time-stamp defines a validity period for the communication session.

14. The method of claim 11, wherein the information comprises an Internet Protocol address associated with the client device.

15. The method of claim 1, wherein the communication session occurs over a network using a Virtual Private Network protocol.

16. A system for assisting in establishing a secure communication, comprising:
   an encryption-key generator;
   a credential server system configured to generate a session identifier with an embedded password;
   a plurality of authentication servers adapted to receive an encrypted object derived from the session identifier with the embedded password, extract the password from the encrypted object, and authenticate a communication session by a remote device using the password, the session identifier not received directly from the credential server, and the plurality of authentication servers not in direct communication with the credential server,
   wherein the plurality of authentication servers are adapted to authenticate the communication session using the encrypted object, and without obtaining the password from a source other than the client device.

17. The system of claim 16, wherein the remote device has an IP address corresponding to a network latency map of a plurality of authentication servers.

18. The system of claim 16, wherein each of the plurality of the authentication servers is configured with a unique encryption key.

19. A system for assisting in establishing a secure communication, comprising:
   memory storing one or more encryption keys shared with a credential server;
   a credential decryptor configured to obtain a password from an encrypted communication session identifier, the encrypted communication session identifier generated by the credential server and received from a remote device;
   an authenticator adapted to communicate with the remote device to authenticate a communication session for the device using the password,
   wherein the authenticator is adapted to authenticate the communication session using the encrypted communication session identifier, and without obtaining the password from a source other than the remote device.

20. The system of claim 19, further comprising a verifier that verifies session-related information obtained from the session identifier.

21. The system claim of 20, wherein the session-related information comprises a session time indicator, and wherein the verifier verifies that a time for the communication session has not expired.

22. A system for assisting in establishing a secure communication, comprising:
   memory storing one or more encryption keys shared with a credential server;
   means for obtaining a password from an encrypted communication session identifier, the encrypted communication session identifier generated by the credential server and received from a remote device;
   an authenticator adapted to communicate with the remote device to authenticate a communication session for the device using the password,
   wherein the authenticator is adapted to authenticate the communication session using the encrypted communication session identifier, and without obtaining the password from a source other than the client device.

23. The system of claim 22, further comprising a client program configured to automate choosing an authentication server.

24. The method of claim 1, wherein the encrypted session identifier is received from the client device without input from a user.

* * * * *

UNITED STATES PATENT AND TRADEMARK OFFICE
CERTIFICATE OF CORRECTION

| | |
|---|---|
| PATENT NO. | : 7,958,544 B2 |
| APPLICATION NO. | : 11/781736 |
| DATED | : June 7, 2011 |
| INVENTOR(S) | : Kai Chen et al. |

It is certified that error appears in the above-identified patent and that said Letters Patent is hereby corrected as shown below:

In column 16, line 1, in claim 19, delete "decryptor" and insert -- decrypter --, therefor.

In column 16, line 16, in claim 21, delete "claim of 20," and insert -- of claim 20, --, therefor.

Signed and Sealed this
Ninth Day of August, 2011

David J. Kappos
*Director of the United States Patent and Trademark Office*